(12) United States Patent
Willis et al.

(10) Patent No.: US 10,125,711 B2
(45) Date of Patent: Nov. 13, 2018

(54) SYSTEMS FOR FUEL DELIVERY

(71) Applicant: General Electric Company, Schenectady, NY (US)

(72) Inventors: Jeffrey David Willis, Harborcreek, PA (US); James Robert Mischler, Girard, PA (US); Leslie Orin Trask, McKean, PA (US); Daniel Yerace, Erie, PA (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 14/811,928

(22) Filed: Jul. 29, 2015

(65) Prior Publication Data

US 2017/0030281 A1   Feb. 2, 2017

(51) Int. Cl.
*F02D 41/22* (2006.01)
*F02M 59/46* (2006.01)
*F02D 41/00* (2006.01)
*F02D 41/38* (2006.01)

(52) U.S. Cl.
CPC ......... *F02D 41/22* (2013.01); *F02D 41/0027* (2013.01); *F02D 41/3809* (2013.01); *F02M 59/464* (2013.01); *F02D 2041/225* (2013.01)

(58) Field of Classification Search
CPC .. F02D 41/22; F02D 41/3809; F02D 41/0027; F02D 2041/225; F02M 59/464
See application file for complete search history.

(56) References Cited

U.S. PATENT DOCUMENTS

| 4,051,716 A | 10/1977 | Mooney | |
|---|---|---|---|
| 5,795,995 A * | 8/1998 | Shimaoka | F02M 65/003 73/40 |
| 6,467,466 B1 * | 10/2002 | Maekawa | F02D 41/0027 123/198 D |
| 7,272,488 B2 * | 9/2007 | Hayashi | F02M 25/0827 701/114 |
| 7,762,234 B2 * | 7/2010 | Ulrey | F02B 1/12 123/198 D |
| 2010/0275880 A1 | 11/2010 | Ulrey et al. | |
| 2012/0210981 A1 | 8/2012 | Ulrey et al. | |
| 2012/0324985 A1 | 12/2012 | Gu et al. | |
| 2014/0116375 A1 | 5/2014 | Kim et al. | |

(Continued)

FOREIGN PATENT DOCUMENTS

| CN | 102840034 A | 12/2012 |
|---|---|---|
| WO | 2011094704 A1 | 8/2011 |

OTHER PUBLICATIONS

International Search Report and Written Opinion issued in connection with corresponding Application No. PCT/US2016/044454 dated Oct. 31, 2016.

*Primary Examiner* — David Hamaoui
(74) *Attorney, Agent, or Firm* — GE Global Patent Operation; John A. Kramer

(57) ABSTRACT

Various systems are provided for delivering fuel to an engine. In one example, a system includes a controller and a fluid system configured to maintain a fluid at a pressure downstream of a check valve. The controller may be configured to determine if a leak is present in the fluid system based on a first pressure decay rate of the fluid system, and responsive to identifying that a leak is present in the fluid system, differentiate between an internal leak and an external leak based on a leak flow rate as fluid system pressure decreases.

17 Claims, 7 Drawing Sheets

(56) References Cited

U.S. PATENT DOCUMENTS

2014/0137572 A1 5/2014 Steffen
2014/0318504 A1 10/2014 Pearce et al.
2014/0331964 A1 11/2014 Grant et al.

* cited by examiner

SYSTEMS FOR FUEL DELIVERY

BACKGROUND

Technical Field

Embodiments of the subject matter disclosed herein relate to fuel delivery systems.

Discussion of Art

Vehicles include power sources, such as engines, which may be configured to combust one or more fuel types, such as diesel and/or natural gas. In some vehicles, liquid fuel is provided to the engine by a common rail liquid fuel system. One type of common rail liquid fuel system comprises a low-pressure fuel pump in fluid communication with a high-pressure fuel pump, and a fuel rail in fluid communication with the high-pressure fuel pump and further in fluid communication with at least one engine cylinder. The high-pressure fuel pump pressurizes fuel for delivery through the fuel rail. Fuel travels through the fuel rail to at least one fuel injector, and ultimately to at least one engine cylinder where fuel is combusted to provide power to the vehicle. In engines configured to combust gaseous fuel such as natural gas, the gaseous fuel travels through a gaseous fuel rail to at least one gas admission valve, and ultimately to at least one engine cylinder where the gaseous fuel is combusted to provide power to the vehicle.

In order to reduce the likelihood of engine degradation, the common rail liquid fuel system may be monitored for fuel leaks. Once a leak is detected, the engine is typically shut down to prevent engine degradation and/or excessive emissions. However, such restrictive action may not be necessary if the leak is internal, e.g., if the leak is a leak from the high-pressure segment of the fuel system to the low-pressure segment of the fuel system. Further engine degradation may occur if gaseous fuel gets trapped in the gaseous fuel rail at engine shutdown, as the gas admission valves may allow gaseous fuel to expand to the engine and/or exhaust, which can cause combustion issues leading to engine degradation during a subsequent engine restart. However, simply venting the gaseous fuel to atmosphere comprises emissions.

BRIEF DESCRIPTION

In one example, a system includes a controller and a fluid system configured to maintain a fluid at a pressure downstream of a check valve. The controller is configured to determine if a leak is present in the fluid system based on a first pressure decay rate of the fluid system, and responsive to identifying that a leak is present in the fluid system, differentiate between an internal leak and an external leak based on a leak flow rate as fluid system pressure decreases.

In another example, a system includes a controller and a gaseous fuel supply system to supply gaseous fuel from a gaseous fuel storage source to an engine having a plurality of cylinders. The controller is configured to detect a request to shut down the engine, and in response to detecting the request, remove gaseous fuel trapped within the gaseous fuel supply system by closing a gaseous fuel supply valve and selectively fueling gaseous fuel to the engine.

In a further example, a system includes an engine having a plurality of cylinders configured to combust liquid fuel and gaseous fuel, a gaseous fuel supply system including a gaseous fuel rail having a plurality of gas admission valves, each gas admission valve to supply gaseous fuel to a respective cylinder of the plurality of cylinders, and a gaseous fuel supply valve located upstream of the gaseous fuel rail, an expansion chamber fluidically coupled to the gaseous fuel supply system, and a controller. The controller is configured to detect a request to shut down the engine, and in response to detecting the request, remove gaseous fuel trapped within the gaseous fuel supply system by closing the gaseous fuel supply valve and expanding the gaseous fuel in the expansion chamber.

DETAILED DESCRIPTION

Figure 1:
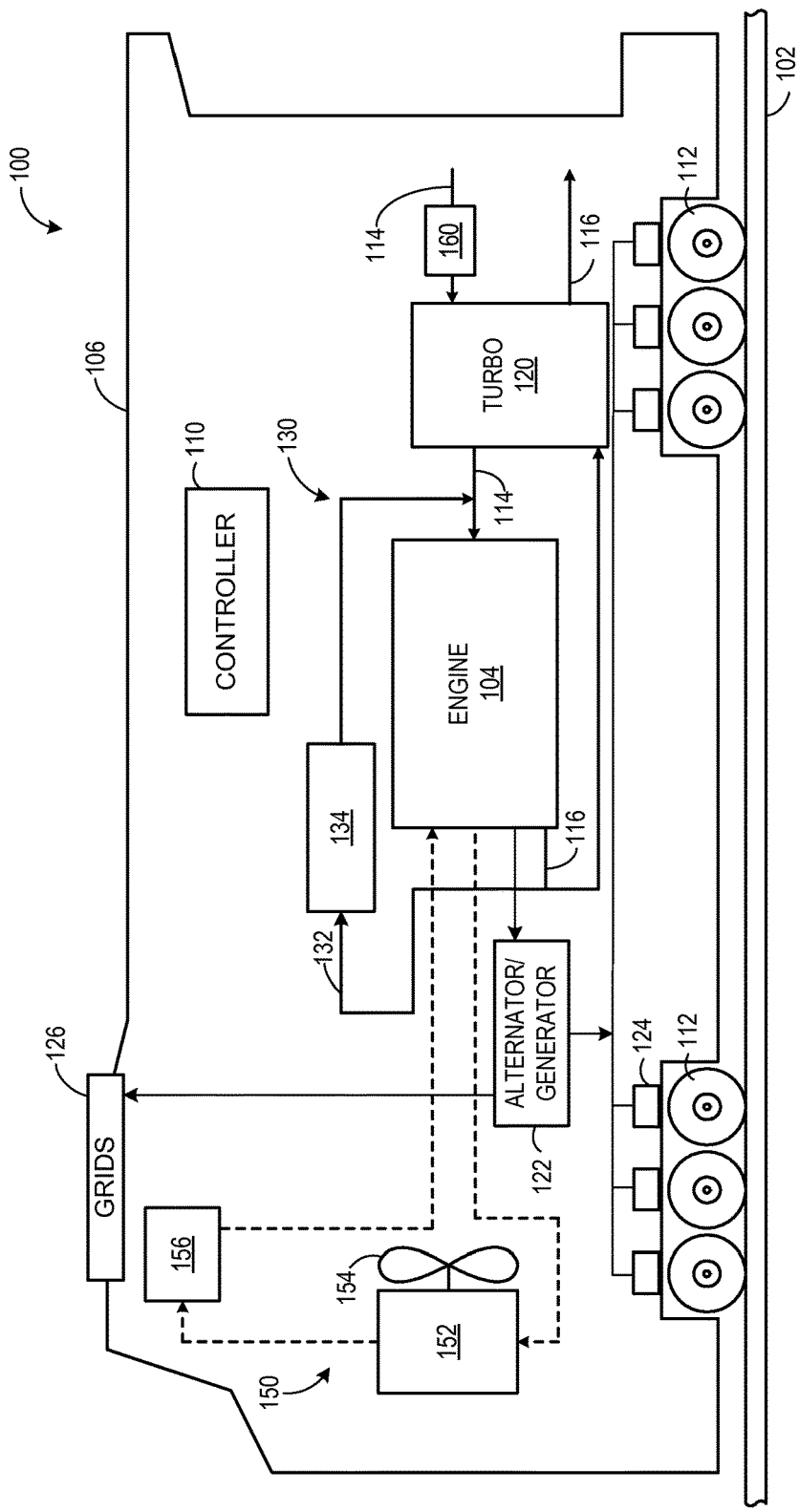
FIG. 1 shows a schematic diagram of an embodiment of a vehicle with an engine.
Figure 2:
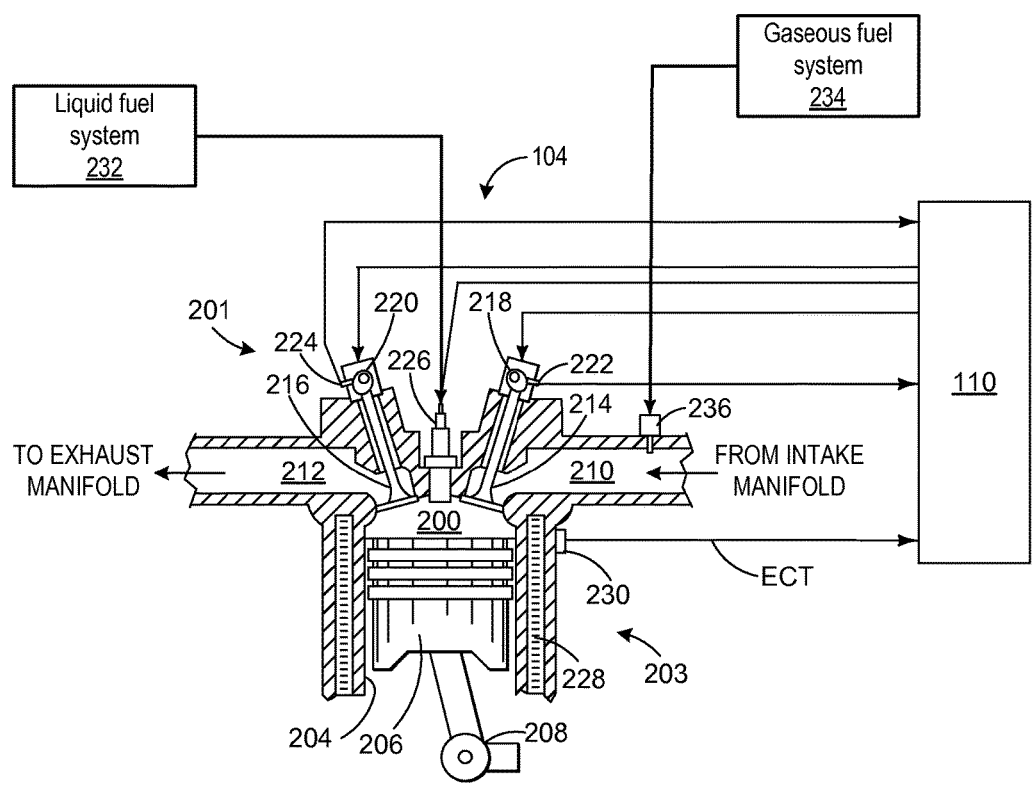
FIG. 2 shows a schematic diagram of an example cylinder of a multi-fuel engine.
Figure 3:
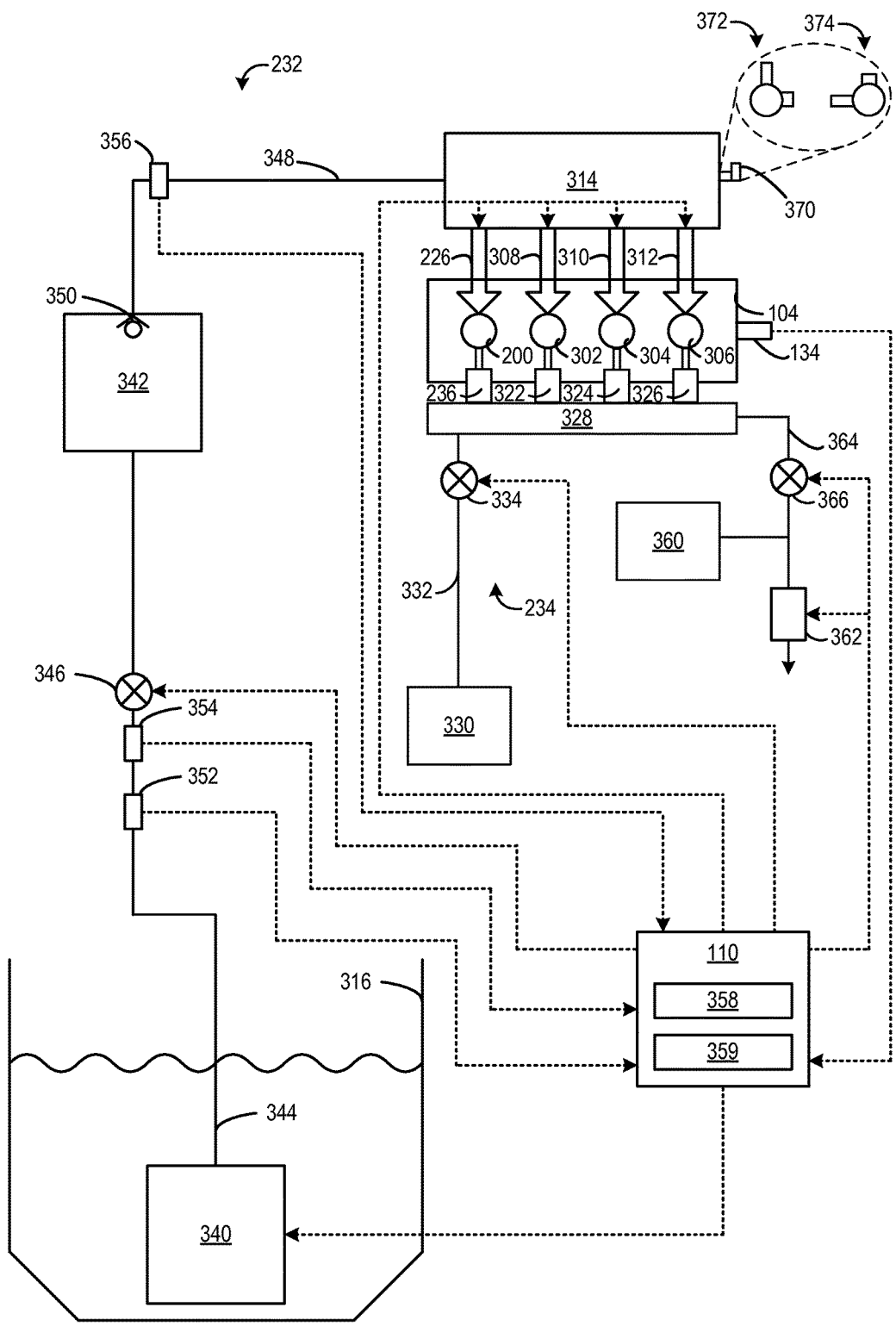
FIG. 3 shows a schematic diagram of an example multi-fuel engine.
Figure 5:
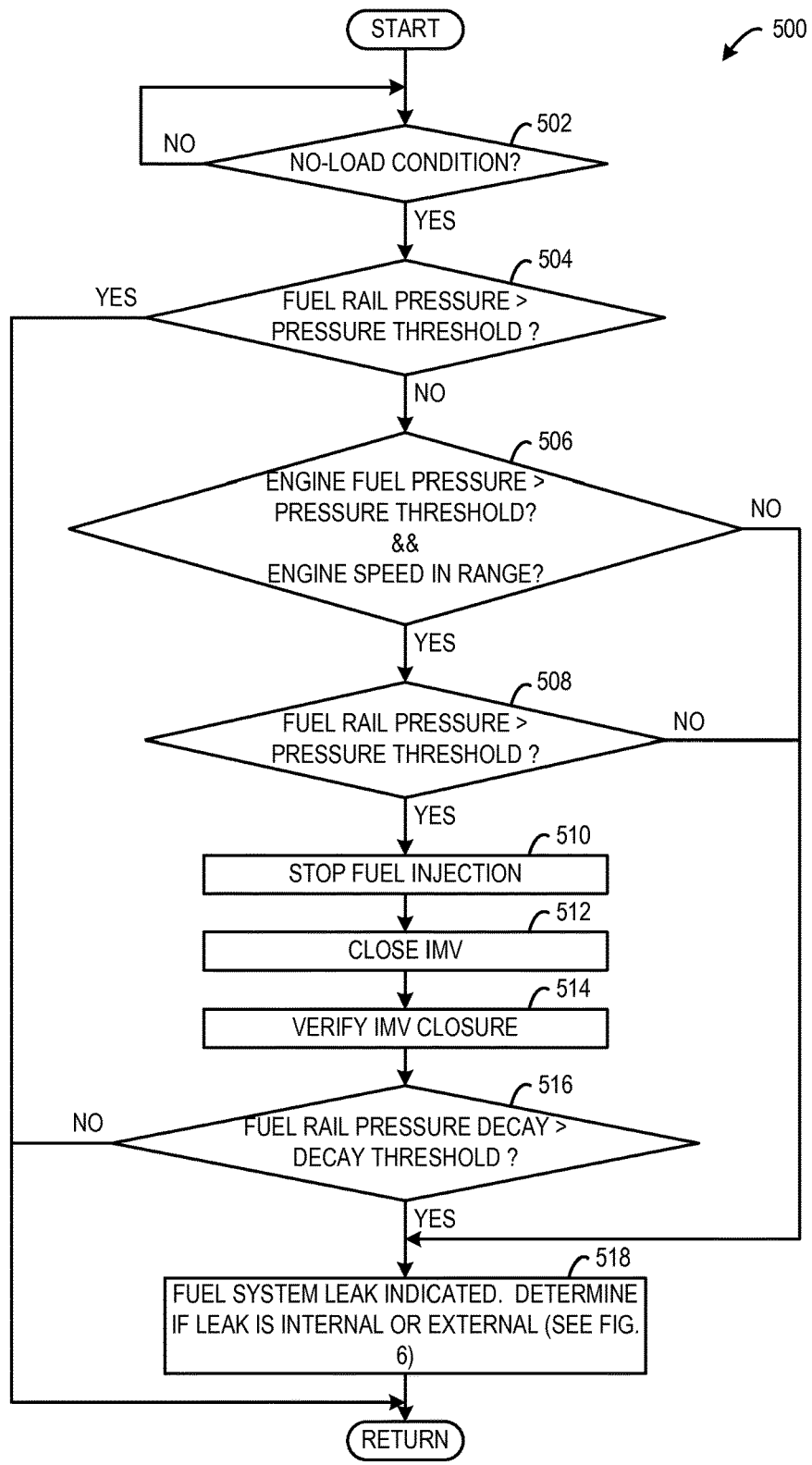
FIGS. 5-6 are flow charts illustrating example methods for identifying a leak in a liquid fuel system.
Figure 6:
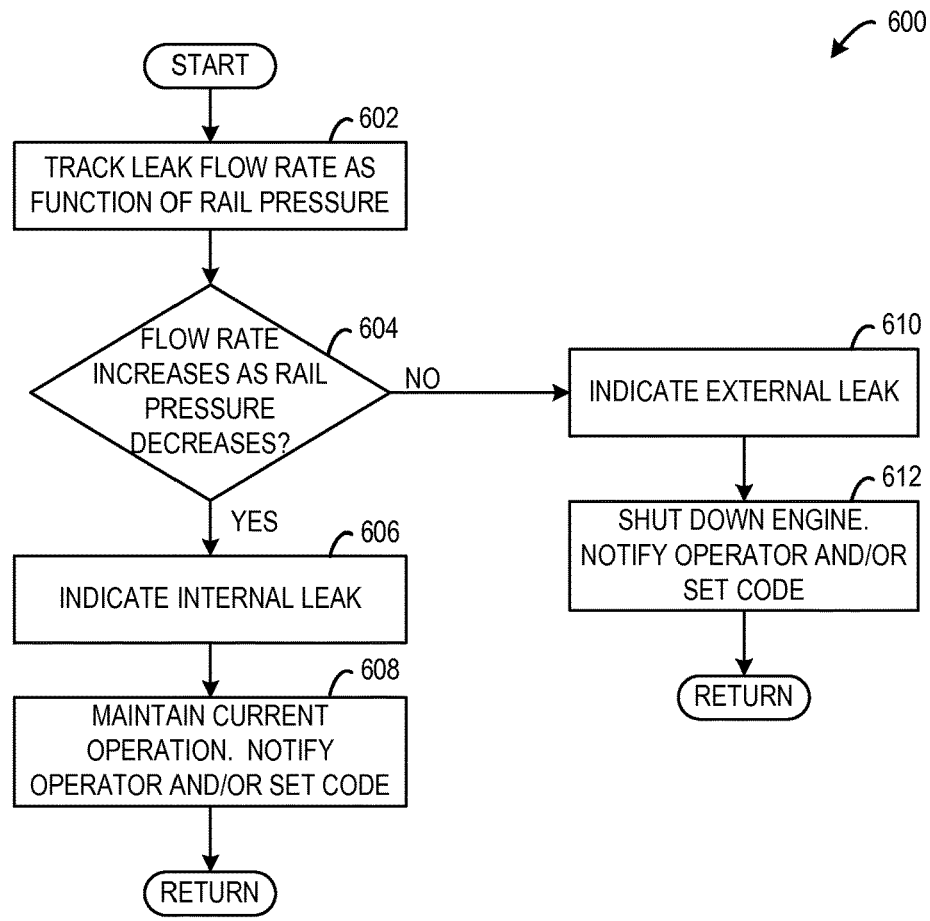
Figure 7:
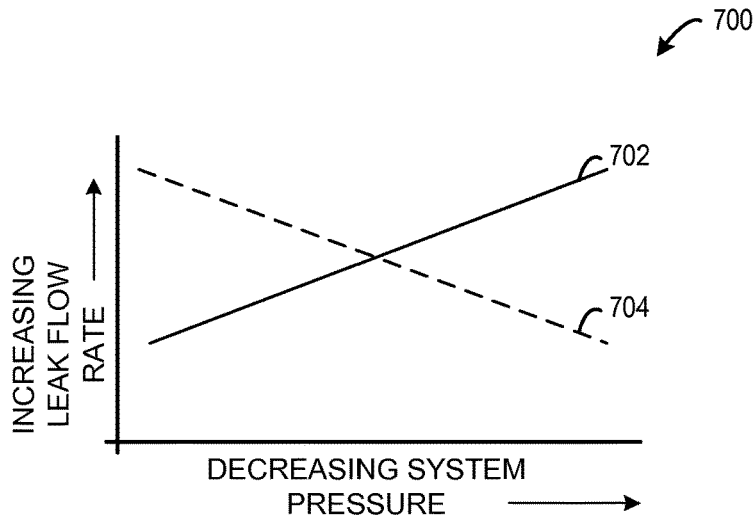
FIG. 7 is a diagram illustrating an example relationship between a leak flow rate and system pressure for an internal and external leak.
Figure 8:
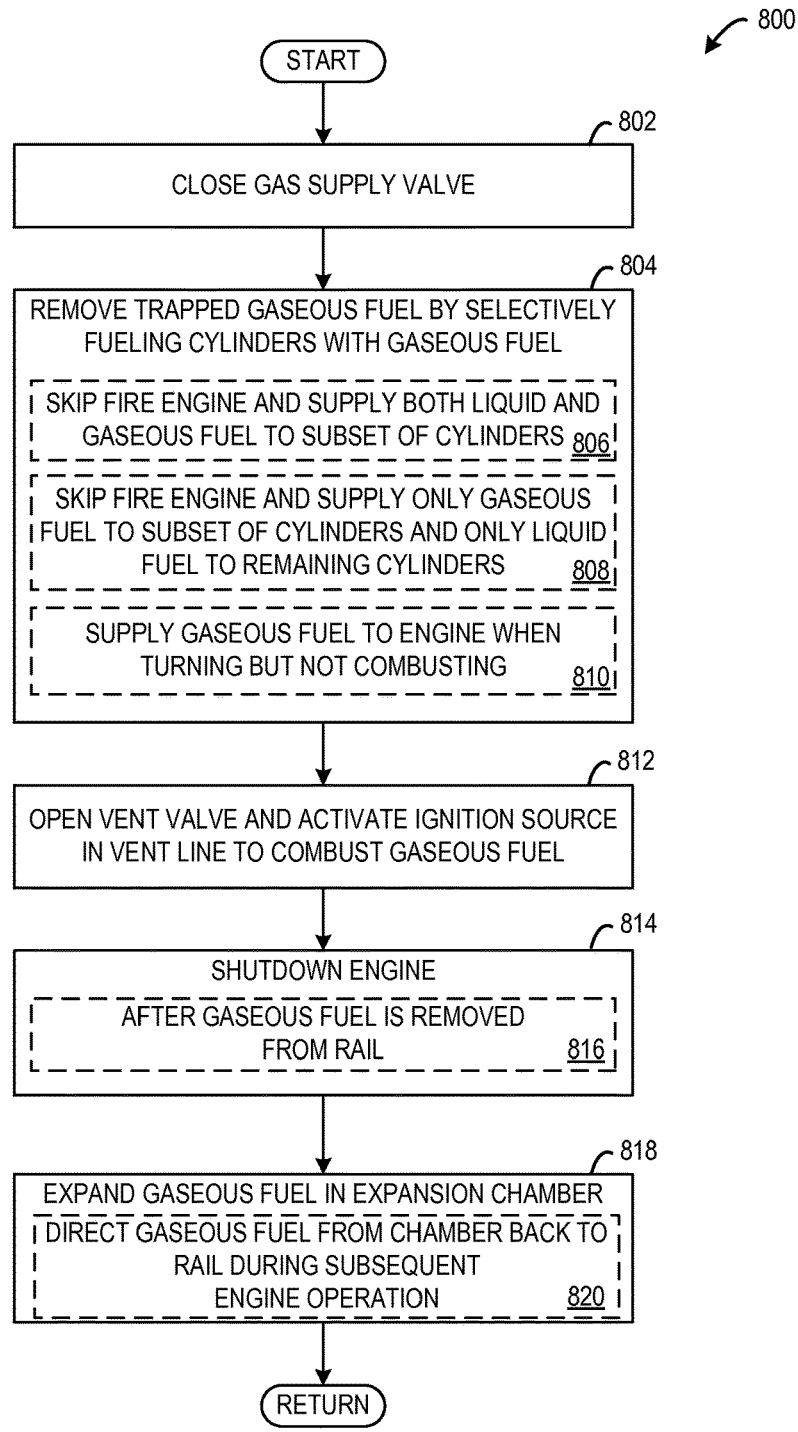
FIG. 8 is a flow chart illustrating an example method for removing gaseous fuel trapped in a gaseous fuel rail.

Embodiments of the subject matter disclosed herein relate to fuel delivery systems for an engine of a vehicle, such as the vehicle illustrated in FIG. 1 and the engine illustrated in FIG. 2. The fuel delivery systems may include one or more of a liquid fuel system to supply liquid fuel (e.g., diesel) to the engine and a gaseous fuel system to supply gaseous fuel (e.g., natural gas) to the engine, as shown in FIG. 3. The liquid fuel system and/or gaseous fuel system may be controlled via a controller according to the methods illustrated in FIGS. 4-6 and 8. For example, the liquid fuel system may be monitored for leaks, as illustrated in FIG. 5, and if a leak is identified, the leak may be determined to be an internal or external leak, as shown in FIG. 6. The determination of whether the leak is internal or external may be based on the directionality of the leak flow rate as system pressure decreases, as shown by the graph of FIG. 7. In another example, the gaseous fuel system may be controlled to remove extra gaseous fuel in a gaseous fuel rail prior to, during, and/or after an engine shutdown and before a subsequent engine start, as shown in FIG. 8. By monitoring for liquid fuel system leaks and/or removing trapped gaseous fuel, engine degradation and undesired emissions may be avoided.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a self-propelled rail vehicle, and more broadly, as an example of a mobile platform, supporting a system incorporating an embodiment of the invention.

Before further discussion of the approach for delivering liquid and/or gaseous fuel while maintaining emission compliance and avoiding engine degradation, an example of a platform is disclosed in which an engine may be configured for a vehicle, such as a rail vehicle. For example, FIG. 1 shows a block diagram of an embodiment of a vehicle system 100, herein depicted as a rail vehicle or other vehicle 106 (e.g., locomotive), configured to run on a rail 102 via a plurality of wheels 112. As depicted, the rail vehicle includes an engine 104. In other non-limiting embodiments, the engine may be a stationary engine, such as in a power-plant application, or an engine in a marine vessel or other off-highway vehicle propulsion system as noted above.

The engine receives intake air for combustion from an intake passage 114. The intake passage receives ambient air from an air filter 160 that filters air from outside of the vehicle. Exhaust gas resulting from combustion in the engine is supplied to an exhaust passage 116. Exhaust gas flows through the exhaust passage, and out of an exhaust stack of the vehicle. In one example, the engine is a diesel engine that combusts air and diesel fuel through compression ignition. In other non-limiting embodiments, the engine may alternatively or additionally combust fuel including gasoline, kerosene, natural gas, biodiesel, or other petroleum distillates of similar density through compression ignition (and/or spark ignition).

As depicted in FIG. 1, the engine is coupled to an electric power generation system, which includes an alternator/generator 122 and electric traction motors 124. For example, the engine is a diesel and/or natural gas engine that generates a torque output that is transmitted to the generator which is mechanically coupled to the engine. In one embodiment herein, engine is a multi-fuel engine operating with diesel fuel and natural gas, but in other examples engine may use various combinations of fuels other than diesel and natural gas.

The generator produces electrical power that may be stored and applied for subsequent propagation to a variety of downstream electrical components. As an example, the generator may be electrically coupled to a plurality of traction motors and the generator may provide electrical power to the plurality of traction motors. As depicted, the plurality of fraction motors are each connected to one of the plurality of wheels to provide tractive power to propel the vehicle. One example configuration includes one traction motor per wheel set. As depicted herein, six pairs of traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by the alternator/generator.

In some embodiments, the vehicle system may include a turbocharger 120 that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Further, in some examples, the vehicle system may additionally or alternatively include a supercharger, where a compressor is driven by a motor, for example.

In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or systems. In some examples, an aftertreatment system may not be included in the vehicle system, and engine emissions may be controlled in an alternative manner, such as via exhaust gas recirculation, described below.

The vehicle system may further include an exhaust gas recirculation (EGR) system 130 coupled to the engine, which routes exhaust gas from the exhaust passage of the engine to the intake passage downstream of the turbocharger. In some embodiments, the exhaust gas recirculation system may be coupled exclusively to a group of one or more donor cylinders of the engine (also referred to a donor cylinder system). As depicted in FIG. 1, the EGR system includes an EGR passage 132 and an EGR cooler 134 to reduce the temperature of the exhaust gas before it enters the intake passage. By introducing exhaust gas to the engine, the amount of available oxygen for combustion is decreased, thereby reducing the combustion flame temperatures and reducing the formation of nitrogen oxides (e.g., NOx).

In some embodiments, the EGR system may further include an EGR valve for controlling an amount of exhaust gas that is recirculated from the exhaust passage of the engine to the intake passage of the engine. The EGR valve may be an on/off valve controlled by a controller, or it may control a variable amount of EGR, for example. As shown in the non-limiting example embodiment of FIG. 1, the EGR system is a high-pressure EGR system. In other embodiments, the vehicle system may additionally or alternatively include a low-pressure EGR system, routing EGR from downstream of the turbine to upstream of the compressor.

As depicted in FIG. 1, the vehicle system further includes a cooling system 150. The cooling system circulates coolant through the engine to absorb waste engine heat and distribute the heated coolant to a heat exchanger, such as a radiator 152. A fan 154 may be coupled to the radiator in order to maintain an airflow through the radiator when the vehicle is moving slowly or stopped while the engine is running. In some examples, fan speed may be controlled by a controller. Coolant which is cooled by the radiator enters a tank 156. The coolant may then be pumped by a water, or coolant, pump (not shown) back to the engine or to another component of the vehicle system, such as the EGR cooler.

The vehicle further includes an engine controller 110 (referred to hereafter as the controller) to control various components related to the vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of vehicle operation.

The controller may receive information from a plurality of sensors and may send control signals to a plurality of actuators. The controller, while overseeing control and management of the vehicle, may be configured to receive signals from a variety of engine sensors, as further elaborated herein, in order to determine operating parameters and operating conditions, and correspondingly adjust various engine actuators to control operation of the vehicle. For example, the engine controller may receive signals from various engine sensors including, but not limited to, engine speed, engine load, intake manifold air pressure, boost pressure, exhaust pressure, ambient pressure, ambient temperature, exhaust temperature, engine coolant pressure, gas temperature in the EGR cooler, or the like. Correspondingly, the controller may control the vehicle by sending commands to various components such as the traction motors, the alternator/generator, cylinder valves, fuel injectors, a notch throttle, or the like. Other actuators may be coupled to various locations in the rail vehicle.

FIG. 2 depicts an embodiment of a combustion chamber, or cylinder 200, of a multi-cylinder internal combustion engine, such as the engine described above with reference to FIG. 1. The cylinder may be defined by a cylinder head 201, housing the intake and exhaust valves and liquid fuel injector, described below, and a cylinder block 203.

The engine may be controlled at least partially by a control system including controller 110 which may be in further communication with a vehicle system, such as the locomotive described above with reference to FIG. 1. As described above, the controller may further receive signals from various engine sensors including, but not limited to, engine speed, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. Correspondingly, the controller may control the vehicle system by sending commands to various components such as alternator, cylinder valves, throttle, fuel injectors, etc.

The cylinder (i.e., combustion chamber) may include cylinder liner 204 with a piston 206 positioned therein. The piston may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The cylinder receives intake air for combustion from an intake including an intake passage 210. The intake passage receives intake air via an intake manifold. The intake passage may communicate with other cylinders of the engine in addition to the cylinder, for example, or the intake passage may communicate exclusively with the cylinder.

Exhaust gas resulting from combustion in the engine is supplied to an exhaust including an exhaust passage 212. Exhaust gas flows through the exhaust passage, to a turbocharger in some embodiments (not shown in FIG. 2) and to atmosphere, via an exhaust manifold. The exhaust passage may further receive exhaust gases from other cylinders of the engine in addition to the cylinder, for example.

Each cylinder of the engine may include one or more intake valves and one or more exhaust valves. For example, the cylinder is shown including at least one intake poppet valve 214 and at least one exhaust poppet valve 216 located in an upper region of cylinder. In some embodiments, each cylinder of the engine, including the cylinder, may include at least two intake poppet valves and at least two exhaust poppet valves located at the cylinder head.

The intake valve may be controlled by the controller via an actuator 218. Similarly, the exhaust valve may be controlled by the controller via an actuator 220. During some conditions, the controller may vary the signals provided to the actuators to control the opening and closing of the respective intake and exhaust valves. The position of the intake valve and the exhaust valve may be determined by respective valve position sensors 222 and 224, respectively, and/or by cam position sensors. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

In some embodiments, each cylinder of the engine may be configured with one or more fuel injectors for providing fuel thereto. As a non-limiting example, FIG. 2 shows the cylinder including a fuel injector 226. The fuel injector is shown coupled directly to the cylinder for injecting fuel directly therein. In this manner, the fuel injector provides what is known as direct injection of a fuel into the combustion cylinder. The fuel may be delivered to the fuel injector from a first, liquid fuel system 232, including a fuel tank, fuel pumps, and a fuel rail (described in more detail with respect to FIG. 3). In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition).

Further, each cylinder of the engine may be configured to receive gaseous fuel (e.g., natural gas) alternative to or in addition to diesel fuel. The gaseous fuel may be provided to the cylinder via the intake manifold, as explained below. As shown in FIG. 2, the intake passage may receive a supply of gaseous fuel from a second, gaseous fuel system 234, via one or more gaseous fuel lines, pumps, pressure regulators, etc., located upstream of the cylinder. In some embodiments, the gaseous fuel system may be located remotely from the engine, such as on a different vehicle (e.g., on a fuel tender car), and the gaseous fuel may be supplied to the engine via one or more fuel lines that traverse the separate vehicles. However, in other embodiments the gaseous fuel system may be located on the same vehicle as the engine.

A plurality of gas admission valves, such as gas admission valve 236, may be configured to supply gaseous fuel from the gaseous fuel system to each respective cylinder via respective intake passages. For example, a degree and/or duration of opening of the gas admission valve may be adjusted to regulate an amount of gaseous fuel provided to the cylinder. As such, each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel. To regulate the amount of gaseous fuel provided by the single-point fumigation system, in some examples a gaseous fuel control valve may be positioned at a junction between a gaseous fuel supply line and the engine intake air supply line or intake manifold. The gaseous fuel control valve degree and/or duration of opening may be adjusted to regulate the amount of gaseous fuel admitted to the cylinders. In other examples, the amount of gaseous fuel admitted to the cylinders in the single-point fumigation system may be regulated by another mechanism, such as control of a gaseous fuel regulator, via control of a gaseous fuel pump, etc.

FIG. 3 illustrates multiple cylinders of engine 104, including cylinder 200, cylinder 302, cylinder 304, and cylinder 306. While four cylinders arranged in-line are illustrated in FIG. 3, such an arrangement is non-limiting, and other engine configurations are possible. For example, the engine may be a V-6, V-8, V-12, V-16, I-6, I-8, or other engine type. The engine may be supplied one or more of liquid fuel from the liquid fuel system and gaseous fuel from the gaseous fuel system. As such, each cylinder of the engine includes a liquid fuel injector, including injector 226 as well as injectors 308, 310, and 312. Each liquid fuel injector is supplied with liquid fuel from a common fuel rail 314. The common fuel rail may be supplied with fuel from a liquid fuel tank 316 (e.g., a diesel fuel storage tank).

A low-pressure fuel pump 340 is in fluid communication with the fuel tank. In this embodiment, the low-pressure fuel pump is disposed inside of the fuel tank and can be immersed below the liquid fuel level. In alternative embodiments, the low-pressure fuel pump may be coupled to the outside of the fuel tank and pump fuel through a suction device. Operation of the low-pressure fuel pump is regulated by the controller.

Liquid fuel is pumped by the low-pressure fuel pump from the fuel tank to a high-pressure fuel pump 342 through a conduit 344. A valve 346 is disposed in the conduit and regulates fuel flow through the conduit. For example, the valve is an inlet metering valve (IMV). The IMV is disposed upstream of the high-pressure fuel pump to adjust a flow rate of fuel that is provided to the high-pressure fuel pump and further to the common fuel rail for distribution to the plurality of liquid fuel injectors for fuel injection. For example, the IMV may be a solenoid valve, opening and closing of which is regulated by the controller. In other words, the controller commands the IMV to be fully closed, fully open, or a position in between fully closed and fully opened in order to control fuel flow to the high-pressure fuel pump to a commanded fuel flow rate. During operation of the vehicle, the IMV is adjusted to meter fuel based on operating conditions, and during at least some conditions may be at least partially open. It is to be understood that the valve is merely one example of a control device for metering fuel and any suitable control element may be employed without departing from the scope of this disclosure. For example, a position or state of the IMV may be electrically controlled by controlling an IMV electrical current. As another example, a position or state of the IMV may be mechanically controlled by controlling a servo motor that adjusts the IMV.

The high-pressure fuel pump increases fuel pressure from a lower pressure to a higher pressure. The high-pressure fuel pump is fluidly coupled with the common fuel rail. The high-pressure fuel pump delivers fuel to the common fuel rail through a conduit 348. The high-pressure pump includes a check valve 350 configured to allow forward flow of fuel from the high-pressure pump to the conduit 348 while preventing backflow from and/or through the high-pressure pump. The plurality of fuel injectors are in fluid communication with the common fuel rail. Each of the plurality of fuel injectors delivers fuel to one of a plurality of engine cylinders in the engine. Fuel is combusted in the plurality of engine cylinders to provide power to the vehicle through an alternator and traction motors, for example. Operation of the plurality of fuel injectors is regulated by the controller. In the embodiment of FIG. 3, the engine includes four fuel injectors and four engine cylinders. In alternative embodiments, more or fewer fuel injectors and engine cylinders can be included in the engine.

Fuel pumped from the fuel tank to an inlet of the IMV by the low-pressure fuel pump may operate at what is referred to as a lower fuel pressure or engine fuel pressure. Correspondingly, components of the liquid fuel system which are upstream of the high-pressure fuel pump operate in a lower fuel pressure or engine fuel pressure region. On the other hand, the high-pressure fuel pump may pump fuel from the lower fuel pressure to a higher fuel pressure or rail fuel pressure. Correspondingly, components of the liquid fuel system which are downstream of the high-pressure fuel pump are in a higher-fuel pressure or rail fuel pressure region.

A fuel pressure in the lower fuel pressure region is measured by a first pressure sensor 352 that is positioned in the conduit 344. The first pressure sensor sends a pressure signal to the controller. In an alternative application, the first pressure sensor is in fluid communication with an outlet of the low-pressure fuel pump. A fuel temperature in the lower fuel pressure region is measured by a temperature sensor 354 that is positioned in conduit 344. The temperature sensor sends a temperature signal to the controller.

A fuel pressure in the higher fuel pressure region is measured by a second pressure sensor 356 that is positioned in the conduit 348. The second pressure sensor sends a pressure signal to the controller. In an alternative application, the second pressure sensor is in fluid communication with an outlet of the high-pressure fuel pump. Note that in some applications various operating parameters may be generally determined or derived indirectly in addition to or as opposed to being measured directly.

Each cylinder of engine may similarly include a gas admission valve to supply gaseous fuel, including gas admission valve 236 as well as gas admission valves 322, 324, and 326. Each gas admission valve may be positioned in an intake passage of a respective cylinder, or other suitable location. The gas admission valves may be supplied gaseous fuel, such as natural gas, from a gaseous fuel rail 328. The gaseous fuel rail may receive gaseous fuel from a gaseous fuel tank (such as an LNG storage tank 330) via a gaseous fuel supply line 332. Control of flow of gaseous fuel to the gaseous fuel rail may be controlled via gaseous fuel supply valve 334. Further, the pressure of the gaseous fuel may be controlled by one or more regulators (not shown). In some examples, the LNG storage tank may be located remotely from engine, such as on board a fuel tender, and may supply fuel to the gaseous fuel supply line via a fluidic coupling. In other examples, the gaseous fuel storage tank may located on board the same vehicle as the engine. Further, in some embodiments, the individual gas admission valves may be dispensed with, and all the cylinders may be supplied with the same gaseous fuel/intake air mixture from an upstream single-point fumigation system.

Each liquid fuel injector of each cylinder, as well as each gas admission valve of each cylinder, may be individually controlled by a controller (such as controller 110) to enable individual cylinder control of the fuel supply. Accordingly, each cylinder may be operated with varying levels of liquid fuel and/or gaseous fuel. In some embodiments, the liquid fuel injectors may be controlled by a different controller than the controller that controls the gas admission valves. Further, in a gaseous fumigation system, rather than controlling the individual gas admission valves, a single gaseous fuel control valve or other gaseous fuel control element may be controlled by the controller to regulate the amount of gaseous fuel admitted to the cylinders.

In an example, a mixture of gaseous fuel and air may be provided to cylinder 200 via the intake passage and, in some embodiments, the gas admission valve. Then, during compression, diesel fuel may be injected to cylinder 200 via fuel injector 226. The diesel fuel may be ignited via compression ignition and subsequently ignite the gaseous fuel. Similar combustion events may occur for each cylinder of engine.

In addition to the sensors mentioned above, the controller receives various signals from a plurality of engine sensors coupled to the engine that may be used for assessment of fuel control health and associated engine operation. For example, the controller receives sensor signals indicative of air-fuel ratio, engine speed, engine load, engine temperature, ambient temperature, fuel value, a number of cylinders actively combusting fuel, etc. In the illustrated implementation, the controller is a computing device, such as microcomputer that includes a processor unit 358, non-transitory computer-readable storage medium device 359, input/output ports, memory, and a data bus. Computer-readable storage medium included in the controller is programmable with computer readable data representing instructions executable by the processor for performing the control routines and methods described below as well as other variants that are not specifically listed.

The controller is operable to adjust various actuators based on different operating parameters received or derived from different signals received from the various sensors, to dynamically assess the health of the liquid fuel system, for example, and control operation of the engine based on the assessment. For example, the controller is operable to check the integrity of the liquid fuel system for fuel leaks, for example after maintenance periods. Such an assessment checks for small leaks that are most likely to occur after improper maintenance so that they can be addressed before becoming bigger fuel leaks. In particular, the controller is operable during a no-load condition of the engine, to stop fuel injection by the plurality of fuel injectors and close the IMV. A no-load condition of the engine occurs when the engine is rotated by inertia or an external torque generated from outside of the engine. As one example, a no-load condition occurs during engine startup when a cranking motor turns the engine. The turning engine drives the fuel pumps to pressurize the common fuel rail. As another example, a no-load condition occurs when a motor/generator powers the engine. As yet another example, a no-load condition occurs when the engine absorbs torque or creates negative or brake torque, such as during a coast down event. A coast down event occurs when an engine is operating at speed and the demanded engine load becomes zero (or no-load) and the engine is rotated by inertia until external resistance slows the engine speed to a designated speed or the demanded engine load increases. Stated another way, a no-load condition of the engine is a condition where fuel injection is not necessary to meet an engine load. The post-maintenance assessment is performed during no-load conditions of the engine so that fuel injection can be stopped without interfering with engine operation.

Once fuel injection is stopped and the IMV is closed, the controller monitors fuel pressure decay in the common fuel rail for a first designated duration. The first duration may be designated or selected based on operating conditions, and may be a predetermined duration. If the fuel rail pressure decay rate of the fuel pressure in the common fuel rail is greater than a decay rate threshold after the first designated duration, the controller is operable to set a degradation condition. If the fuel rail pressure decay rate is less than the decay rate threshold, fuel injection is restarted and engine operation continues. Fuel pressure decay refers to a drop or reduction in fuel pressure over time. Fuel pressure decay is monitored during the aforementioned control conditions (injection stopped and the IMV closed) because under such conditions, fuel should be neither significantly leaving nor entering the common fuel rail. Thus, a fuel pressure decay rate greater than the decay rate threshold is indicative of a possible leak condition.

In some implementations, the controller is operable to check that operating conditions are suitable prior to monitoring fuel pressure decay for determining possible fuel leaks. For example, the controller is operable to check that the low-pressure fuel pump is pumping fuel to the common fuel rail so that there is enough fuel pressure built up to determine or measure fuel pressure decay. Correspondingly, the controller is operable to check that the engine is operating in a designated engine speed range where the engine is cranking to operate the fuel pump. By checking that such conditions are in effect, the likelihood of a false positive assessment of a fuel leak in the liquid fuel system may be reduced. Furthermore, the controller is operable to set a degradation condition if the fuel rail pressure is less than a rail fuel pressure threshold for a second designated duration when such conditions are in effect (e.g., the engine fuel pressure at an inlet of the IMV is greater than an engine fuel pressure threshold and an engine speed is in a designated engine speed range). The second designated duration may be the same or different from the first designated duration for monitoring fuel pressure decay. In one example, the first designated duration is 0.2 seconds and the second designated duration is 30 seconds. In other words, if the engine is cranking and the low-pressure fuel pump is pumping fuel, but the fuel pressure is not building beyond the fuel pressure threshold after the second designated duration, then it is assumed that a fuel leak exists or a component of the liquid fuel system is degraded.

In some implementations, the degradation condition may include setting a diagnostic flag and presenting an indication (e.g., visual or audio) of the degradation condition to an operator. In some implementations, the degradation condition may include shutting down the engine. By shutting down the engine in response to detection of a fuel leak, the likelihood of engine degradation, degraded drivability, or the like may be reduced. However, not all fuel leaks may cause engine degradation. For example, if the check valve in the high-pressure fuel pump were to become degraded such that it did not prevent backflow of fuel, the fuel would still be contained within the liquid fuel system, and thus combustion stability and/or emissions issues would not occur. If the engine were automatically shut down in response to a degraded check valve, it may unnecessarily strand the vehicle, delaying arrival of the vehicle at its destination and potentially increasing maintenance costs. Thus, according to embodiments disclosed herein, after it is determined that a leak is present in the liquid fuel system, the leak may be differentiated as being either internal or external based on the directionality of the leak flow rate as system pressure decreases. If the leak is determined to be internal, the engine may continue to operate, avoiding an unnecessary engine shut down. Additional details regarding detecting a liquid fuel system leak are presented below with respect to FIGS. 4-7.

In some examples, the liquid fuel rail may include a pressure relief valve. The pressure relief valve may be a manual valve that can be opened to relive the pressure during high pressure system maintenance. However, if the valve is improperly closed, the system will not develop fuel pressure. For example, conventional handle design may be symmetric. Due to the symmetric design of the handle, sometimes a field operator may misjudge the valve to be in the open instead of closed position, which may lead to a leak the pressure in common rail fuel system.

To prevent such position errors, a pressure relief valve with an asymmetric handle 370 may be present. As shown in FIG. 3, the pressure relief valve may appear differently when in the open position 372 than when in the closed position 374. For example, the valve handle may have multiple protrusions or markings that assume a different orientation when in the open vs. closed position.

Further, the handle may be marked with OPEN & CLOSED markings. The handle may be removable and may be slipped on to the valve shaft prior to opening or closing the valve. The handle and shaft may be designed such that the handle can only slip/engage on the shaft in one (the correct) position. In this way, the handle cannot be improperly placed on the shaft—this ensures that the valve OPEN/CLOSED position is always right/correct. After closing/opening the valve, operator can be certain of the position of the valve, and if the valve is not closed it will be visible clearly.

As explained previously, in some examples the engine is configured to combust gaseous fuel, such as natural gas. The gaseous fuel is supplied to the plurality of cylinders via respective gas admission valves, which receive the gaseous fuel via a gaseous fuel rail. To supply gaseous fuel to the engine, the gaseous fuel is maintained at a greater pressure than intake air pressure. Upon shutdown, the engine intake air pressure becomes near atmospheric. This results in a positive pressure differential between the gaseous fuel supply and engine intake. The pressure differential value will vary depending upon engine power at the instance of shutdown, with the maximum occurring at the engine's highest boost intake air pressure. Upon shutdown there will be a finite amount of gaseous fuel trapped between the gaseous fuel supply valve and individual cylinder gas admission valves. Typically, gas admission valves do not provide sufficient sealing capability. This trapped gas pressure will be relieved by the inherent leakage rate of the gas admission valves. The gaseous fuel may expand into the engine's intake and exhaust systems. During this expansion the gaseous fuel will mix with air and create zones that will be initially too rich for combustion. As the gaseous fuel disperses, the gaseous fuel-air mixture will pass through the combustibility range of the gaseous fuel in air (~5-10%). If the engine is shut-down for an extended period of time, the gaseous fuel-air ratio may become too lean for combustion. Risk exists for engine degradation and potential operator safety at engine restart unless the trapped gaseous fuel can be prevented from entering a shut-down engine.

Thus, to prevent engine degradation, the gaseous fuel may be removed from the gaseous fuel rail prior to engine shutdown and/or prior to a subsequent engine start. In one example, the gaseous fuel supply valve controlling flow of gaseous fuel into the gaseous fuel rail may be closed and the gaseous fuel in the rail may be selectively supplied to the cylinders for a duration prior to engine shutdown or prior to engine start up. The gaseous fuel may be combusted (e.g., supplied to the cylinders along with liquid fuel) or it may be passed through the engine without combusting.

In another example, the gaseous fuel trapped in the rail may be expanded in an expansion chamber 360 fluidically coupled to the gaseous fuel rail. The expansion chamber may be a cylinder or other accumulator that is configured to hold the gaseous fuel as it expands out of the rail. The additional volume provided by the expansion chamber may reduce the pressure of the gaseous fuel in the rail (e.g., to atmospheric pressure), such that it does not leak through the gas admission valves. The expansion chamber may include a diaphragm coupled to a spring and a line fluidically coupled to the intake manifold to urge the gaseous fuel back into the gaseous fuel rail during a subsequent engine start, where the gaseous fuel can be combusted. In other examples, the expansion chamber may include a pneumatic, hydraulic, or electric actuator to push the gaseous fuel back to the rail. The chamber may be of a sufficient size to allow the maximum amount of trapped gaseous fuel to reach atmospheric pressure.

In a further example, in addition or alternative to having an expansion chamber, the gaseous fuel system may include a gaseous fuel canister fluidically coupled to the gaseous fuel rail (e.g., the canister may be included in the gaseous fuel system in place of the expansion chamber) that may include charcoal or other absorbent material to trap hydrocarbons in the gaseous fuel that is vented from the gaseous fuel rail at engine shutdown. The gaseous fuel canister may be coupled to atmosphere, such that as the gaseous fuel is vented from the gaseous fuel rail (e.g., by opening the vent valve in the vent line coupling the gaseous fuel canister to the gaseous fuel rail), the gaseous fuel travels through the absorbent material in the canister, where the hydrocarbons are trapped and any air or other gas is vented to atmosphere. At a subsequent start-up, or when the canister material is fully loaded with hydrocarbons, a purge may be performed where a vacuum source is applied to the canister to strip the hydrocarbons off the absorbent material and direct the hydrocarbons back to the gaseous fuel rail for combustion.

In a still further example, an ignition source 362 may be present in a vent line 364 fluidically coupled to the gaseous fuel rail. When a vent valve 366 is open, the gaseous fuel travels out of the rail and through the vent line, where it will be vented to atmosphere, or if the ignition source is activated, combusted prior to reaching atmosphere. The ignition source may be a spark plug or other suitable component capable of igniting the gaseous fuel. Additional details regarding removing gaseous fuel trapped in a gaseous fuel rail are presented below with respect to FIGS. 4 and 8.

Figure 4:
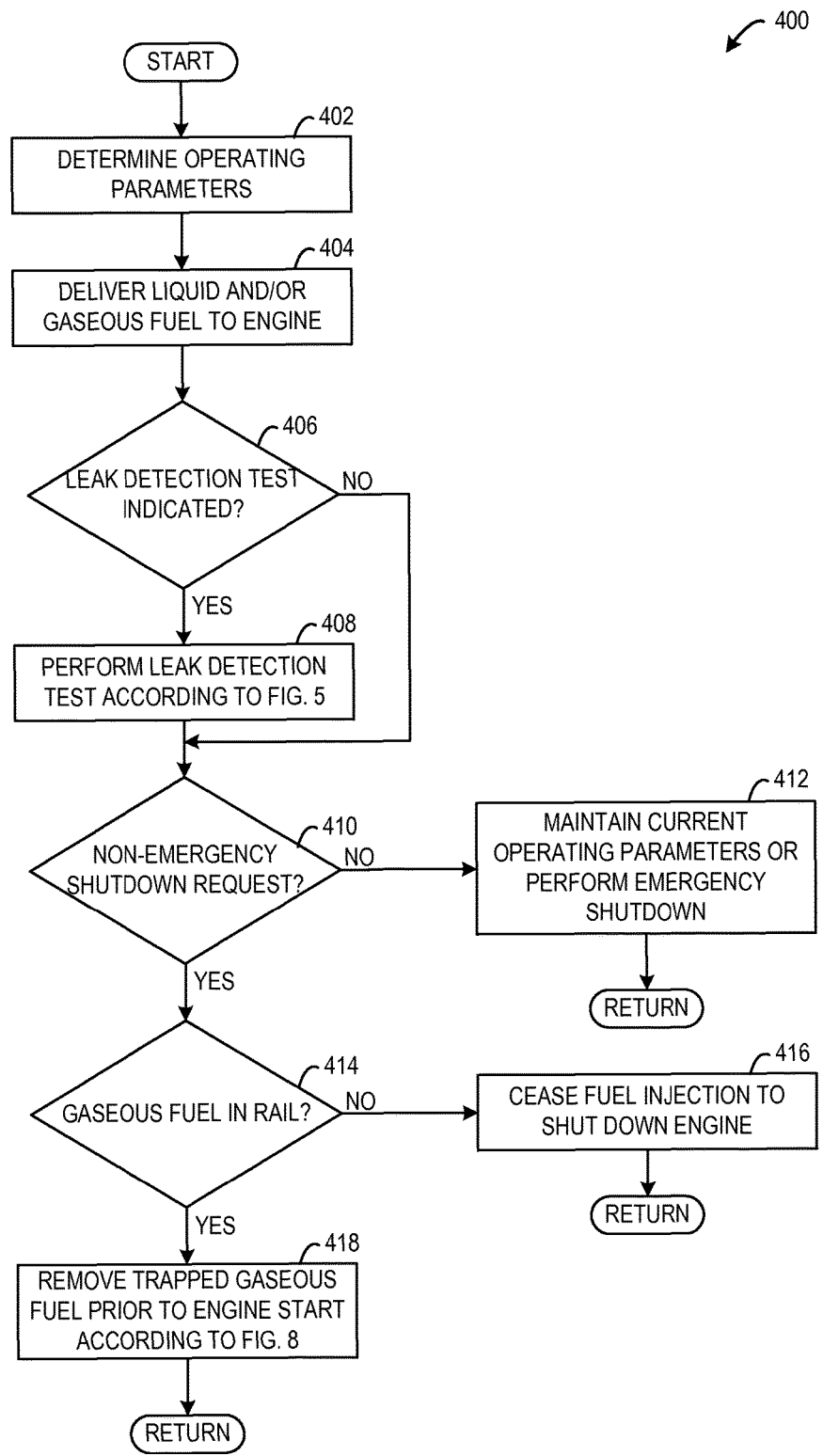
FIG. 4 is a flow chart illustrating an example method for a fuel delivery system.

Turning now to FIG. 4, a method 400 for a fuel delivery system is presented. Method 400 may be carried out according to instructions stored on a memory of a controller, such as controller 110 described above. Method 400 may be carried out in conjunction with various sensors and/or actuators of one or more fuel delivery systems, such as liquid fuel system 232 and gaseous fuel system 234 of FIGS. 2-3. At 402, method 400 includes determining operating parameters. The determined operating parameters may include, but are not limited to, engine speed, engine output, throttle position, engine status (e.g., engine shutdown or start up requested), combustion fuel status (e.g., if the engine is operating with one of or both a liquid and gaseous fuel), elapsed time since a previous leak detection test was carried out, and other parameters.

At 404, method 400 delivers liquid and/or gaseous fuel to the engine. In some examples, only liquid fuel may be delivered to the engine, and thus 100% of the engine power is derived from liquid fuel. In other examples, only gaseous fuel may be delivered to the engine, and thus 100% of the engine power is derived from gaseous fuel. In still further examples, both liquid and gaseous fuel may be delivered to the engine, and thus a portion of the engine power may be derived from liquid fuel and a portion of the engine power may be derived from gaseous fuel. The relative amounts of the different fuels delivered to the engine may be based on the engine type (whether the engine is configured to operate with only liquid fuel, only gaseous fuel, or both), engine speed and/or output, and/or additional parameters.

At 406, method 400 includes determining if a liquid fuel system leak test is indicated. The leak test may be performed if a threshold amount of time has elapsed since a previous leak test was performed, or in response to other suitable parameters. If the leak test is indicated, method 400 proceeds to 408 to perform the leak detection test according to the method described below with respect to FIG. 5. If the leak detection test is not to be performed, method 400 proceeds to 410 to determine if a non-emergency engine shutdown request has been received, for example from a vehicle operator. If the leak test is performed, method 400 may still progress to 410 to determine if the non-emergency engine shutdown has been requested, upon completion of the leak test.

A non-emergency shutdown may include a standard shutdown that is performed upon request from a vehicle operator and/or upon completion of a vehicle trip, for example, as opposed to an emergency shutdown request, which may be performed automatically by the controller or by the vehicle operator in response to an emergency condition, such as a degraded engine component that could cause catastrophic engine or vehicle degradation if the vehicle were allowed to continue to operate. During an emergency shutdown, non-essential tasks that may be completed at shutdown, such as the removal of trapped gaseous fuel, described below, may be dispensed with in order to expedite shutdown.

Accordingly, if a non-emergency shutdown request is not received, method 400 proceeds to 412 to either perform an emergency shutdown if an emergency shutdown request is received, or to maintain current operating parameters (e.g., continue to deliver liquid and/or gaseous fuel at the specified amounts) if no engine shutdown request is received. Method 400 then returns.

If a non-emergency shutdown request is received, method 400 proceeds to 414 to determine if gaseous fuel is present in the gaseous fuel rail. For example, if the engine is currently operating with gaseous fuel, it may be determined that at least some gaseous fuel is likely to be present in the gaseous fuel rail. However, if the engine is not currently combusting gaseous fuel, or has not combusted gaseous fuel for a threshold amount of time, it may be determined that no gaseous fuel is likely to be present in the gaseous fuel rail. Other mechanisms for determining if gaseous fuel is present in the gaseous fuel rail are possible, such as based on output from a gaseous fuel rail pressure sensor.

If it is determined that no gaseous fuel is present in the gaseous fuel rail, method 400 proceeds to 416 to cease fuel injection (e.g., liquid fuel injection) according to a standard, non-emergency shutdown protocol in order to shutdown the engine. Method 400 then returns. If it is determined that at least some gaseous fuel is present in the gaseous fuel rail, method 400 proceeds to 418 to remove trapped gaseous fuel from the gaseous fuel rail prior to a subsequent engine start up, according to the method that will be described below with respect to FIG. 8. Method 400 then returns.

FIG. 5 is a flow chart illustrating a method 500 for determining if a leak is present in a common rail liquid fuel system, such as the liquid fuel system of FIGS. 2-3. In one example, the method 500 is executable by the controller 110, and may be performed as part of method 400, for example in response to an indication that a leak detection test is indicated. At 502, the method 500 includes determining if there is currently a no-load condition of the engine. A no-load condition of the engine may occur when the engine is rotated by inertia or an external torque generated from outside of the engine. As one example, a no-load condition occurs during engine startup when a cranking motor turns the engine. The turning engine drives the fuel pumps to pressurize the common fuel rail. As another example, a no-load condition occurs when a motor/generator powers the engine. As yet another example, a no-load condition occurs when the engine absorbs torque or creates negative or brake torque, such as during a coast down event. Stated another way, a no-load condition of the engine is a condition where fuel injection is not necessary to meet an engine load. In other examples, a no-load condition may occur during idling, where the engine is operated to keep the engine running and to power auxiliary loads, but no power is provided for propulsion. If a no-load condition exists, the method 500 moves to 504. Otherwise, the method 500 returns to 502.

At 504, the method 500 includes determining if a liquid fuel rail pressure is greater than a rail pressure threshold. The determination performed at 504 checks to see if the liquid fuel rail pressure is already built up to a sufficient level for operation. The rail pressure threshold may be set to any suitable pressure level. In one example, the rail pressure threshold is set to 40,000 kPa. If the fuel rail pressure is greater than the rail pressure threshold, the method 500 returns to other operations. Otherwise, the method 500 moves to 506.

At 506, the method 500 includes determining if the liquid fuel rail pressure becomes greater than the rail pressure threshold for a second designated duration while an engine fuel pressure is greater than an engine pressure threshold and an engine speed is in a designated engine speed range. The engine fuel pressure represents the pressure of fuel provided by the low-pressure fuel pump at the inlet of the IMV. The engine speed range determination checks to see if the engine is actually cranking to drive the low-pressure fuel pump. The engine fuel pressure determination checks to see if fuel is actually being provided to the IMV to build pressure in the common fuel rail. If the engine is cranking and the engine fuel pressure is less than the engine pressure threshold, then it can be assumed that there is an insufficient engine fuel pressure to operate the engine and the low-pressure fuel pump may or may not be functioning properly. Accordingly, the method 500 moves to 518. If the engine is cranking and the engine fuel pressure is building pressure beyond the threshold the method 500 moves to 508.

At 508, the method 500 includes determining if the liquid fuel rail pressure is greater than the rail pressure threshold. If the engine is cranking (e.g., engine speed in speed range) and the low-pressure fuel pump is pumping fuel (e.g., engine fuel pressure>engine pressure threshold), but the fuel rail is not pressurizing (e.g., the fuel rail pressure<rail pressure threshold), then it can be assumed that there is a leak in the high pressure fuel system or another type of degradation and the method 500 moves to 518. Otherwise, if the engine is cranking, the low-pressure fuel pump is operating, and the fuel rail pressure is built up to a sufficient pressure level to test for fuel pressure decay, then the method 500 moves to 510.

The second designated duration, the engine fuel pressure threshold, and the engine speed range may be set to any suitable values. In one example, the second designated duration is 30 seconds, the rail fuel pressure threshold is 40,000 kPa, the engine fuel pressure threshold is approximately 241 kPa and the designated engine speed range is between 35 and 325 RPM. If the fuel rail pressure remains greater than the rail pressure threshold for during these operating conditions, the method 500 moves to 510. Otherwise, it can be assumed that there is degradation of the liquid fuel system, such as a gross fuel leak, since fuel rail pressure is unable to remain above the rail pressure threshold. If the fuel pressure becomes less than the rail fuel pressure threshold for the selected duration, the method moves to 518.

At 510, the method 500 includes stopping fuel injection by the plurality of fuel injectors. In one example, stopping fuel injection includes controlling a pulse width modulation signal to command the plurality of fuel injectors to not inject fuel. In some implementations, stopping fuel injection includes turning off a fuel pump that provides fuel to an inlet of the inlet metering valve. Moreover, the fuel injection may be stopped in any suitable way including preventing fuel from entering a high-pressure fuel pump that supplies fuel to the fuel rail, such as by closing an additional cut-off valve or the like.

At 512, the method 500 includes closing the IMV. In one example, closing the IMV includes commanding an IMV electrical current for controlling a position of the IMV to be increased to an electrical current that corresponds to a fully closed position.

At 514, the method 500 includes verifying closure of the IMV prior to initiating a predetermined duration for measuring a fuel pressure decay rate of the common fuel rail. In one example, verifying closure of the IMV includes starting the first designated duration in response to the IMV electrical current being greater than an electrical current threshold. The electrical current threshold is set to an electrical current that corresponds to the fully closed position of the IMV. In one example, the electrical current threshold is set to 1.8 Amps. By verifying closure of the IMV, a determination accuracy of the fuel pressure decay rate may be increased.

At 516, the method 500 includes determining if a fuel rail pressure decay rate of a fuel pressure in the common fuel rail is greater than a decay threshold after a first designated duration. The pressure decay rate and the first designated duration may be set to any suitable value. In one example, the decay threshold is 500 kPa and the first designated duration is 0.2 seconds. If the fuel rail pressure decay rate is greater than the decay threshold, the method 500 moves to 518. Otherwise, it is determined that a fuel leak does not exist and the method 500 returns to other operations.

At 518, the method 500 includes indicating that a fuel leak is present and determining if the leak is internal or external according to the method described below with respect to FIG. 6. If the leak is determined in response to the fuel rail pressure decay rate of the fuel pressure in the common fuel rail being greater than the decay threshold after the first designated duration, it may indicate that a fuel leak exists in the higher-pressure region of the liquid fuel system between the IMV and the fuel injectors. If the leak is indicated in response to the fuel pressure being less than the fuel rail pressure threshold for the second designated duration where the engine fuel pressure is greater than the engine fuel pressure threshold and the engine speed in a designated engine speed range, it may indicate that a gross fuel leak exists in the liquid fuel system or a component has degraded, since fuel pressure cannot build up in the common fuel rail even though fuel is being pumped by the low-pressure fuel pump. In such cases, the engine may be immediately shutdown rather than performing the method of FIG. 6.

FIG. 6 is a flow chart illustrating a method 600 for differentiating between an external leak and an internal leak of a liquid fuel system, such as the liquid fuel system described above with respect to FIGS. 2-3. An external leak may include a crack in a fuel supply line or the fuel rail, a faulty/leaky fuel injector, or other type of degradation where fuel leaks out of the system, for example to the engine or to the ambient environment. In contrast, an internal leak may include a degraded check valve in a high-pressure fuel pump (e.g., check valve 350 of FIG. 3) that causes fuel to leak out of the high-pressure region (downstream of the high-pressure pump) and into the low-pressure region (upstream of the high-pressure pump). While such a leak may reduce efficiency of the high-pressure pump, it does not pose risk of engine or vehicle degradation. Thus, method 600 differentiates between the two types of leaks in order to prevent an unnecessary emergency engine shutdown. Method 600 may be performed in response to an indication that a liquid fuel system leak is present, as described above. In other examples, method 600 may be performed during other times when fuel system pressure and/or flow rate measurements are available.

At 602, method 600 includes plotting leak flow rate as a function of liquid fuel system pressure, which may be the same as the liquid fuel rail pressure or may be a pressure measurement elsewhere in the fuel system. The leak flow rate may be determined by output from a fuel flow sensor, based on fuel rail pressure, or other suitable mechanisms. The determined leak flow rate and system pressure plotted in 602 may be data collected during the leak test described above, or may be data collected during a subsequent test.

At 604, method 600 determines if the leak flow rate increases as liquid fuel rail pressure decreases. Many types of degradation that result in an external fuel system leak, such as a crack in a pipe comprising a fuel supply line, for example, exhibit larger leak flow rates when system pressure is higher, and the leak flow rate may lessen as the pressure wanes. This is because the higher pressure in the supply line or fuel rail forces more fuel out of the leak flow path; once less fuel is present in the supply line or rail, less pressure is exerted on the leak flow path and thus less fuel flows out of it. In contrast, a degraded check valve may remain seated in its valve seat during higher pressure conditions, due to the high pressure acting against the check valve. Once the system pressure decreases, the valve may begin to move out of its valve seat, opening up the leak flow path. Thus, an internal leak caused by a faulty check valve may be identified based on the directionality of the leak flow rate as system pressure decreases, namely if the leak flow rate actually increases as the pressure decreases.

FIG. 7 is a diagram 700 that depicts leak flow rate as a function of system pressure for an internal leak (depicted by curve 702) and an external leak (depicted by curve 704). While the leak flow rate plotted on the vertical axis increases away from the intercept with the horizontal axis, the system pressure plotted on the horizontal axis decreases away from the intercept with the vertical axis. As shown in diagram 700, the internal leak exhibits increasing leak flow rate with decreasing system pressure. In contrast, the external leak exhibits decreasing leak flow rate with decreasing system pressure.

Returning to FIG. 6, if it is determined at 604 that the leak flow rate increases with decreasing system pressure, method 600 proceeds to 606 to indicate an internal leak, and, at 608, maintain current operating parameters. In some examples, an operator of the vehicle may be notified of the internal leak and/or a diagnostic code may be set. Method 600 then returns.

If it is determined at 604 that the leak flow rate does not increase with decreasing system pressure, method 600 proceeds to 610 to indicate an external leak, and, at 612, shutdown the engine. In some examples, an operator of the vehicle may be notified of the internal leak and/or a diagnostic code may be set. As one example of notifying a vehicle operator, a fuel leak indicator light may be turned on in response to the indication of the internal or the external leak.

Thus, the methods described above with respect to FIGS. 5-6 provide for monitoring a liquid fuel system to determine if a leak is present in the fuel system. In one example, the controller determines if a leak is present in the fluid system based on a first pressure decay rate of the liquid fuel system. If a leak is detected, the leak may be classified as an internal leak where the leaking fuel is not exposed to the environment or an external leak where the leaking fuel is exposed to the environment. In one example, responsive to identifying that a leak is present in the fluid system, the controller is configured to differentiate between an internal leak and an external leak based on a leak flow rate as system pressure decreases. For example, the leak may be classified as internal vs. external based on the directionality of the leak flow rate as system pressure decreases. If the leak is determined to be an internal leak, engine operation may continue due to the lack of exposure of the fuel to the environment. In contrast, if an external leak is detected, the engine may be shutdown.

While the leak determination and classification described above is applied to a fuel system including a high-pressure pump and fuel rail, similar concepts may be applied to other systems that include a pressurized fluid downstream of a check valve, e.g., coolant delivery systems.

FIG. 8 is a flow chart illustrating a method 800 for removing gaseous fuel in a gaseous fuel rail. Method 800 may be carried out according to instructions stored in memory of a controller, such as controller 110, in combination with one or more sensors and/or actuators. For example, method 800 may be carried out by controller 110 in order to adjust gaseous fuel supply valve 334, one or more of the gas admission valves (e.g., valves 236, 322, 324, and/or 326), one or more of the liquid fuel injectors (e.g., injectors 226, 308, 310, 312), ignition source 362, and/or vent valve 366. Method 800 may be carried out in response to receiving a request to perform a non-emergency engine shutdown, as described above with respect to FIG. 4.

At 802, method 800 includes closing a gaseous fuel supply valve. Once the request to shut down the engine is received, the gaseous fuel supply valve may be closed to block flow of additional gaseous fuel into the gaseous fuel rail. Once the flow of gaseous fuel is blocked from reaching the gaseous fuel rail, any additional gaseous fuel trapped in the gaseous fuel rail (e.g., between the gaseous fuel supply valve and plurality of gas admission valves) may be removed before the engine is shut down or before the engine is restarted. Any one or more of the below-described mechanisms may be executed in order to remove the gaseous fuel.

At 804, method 800 includes removing the trapped gaseous fuel by selectively fueling one or more cylinders of the engine with gaseous fuel. Selectively fueling the engine with gaseous fuel may include skip firing the engine and supplying both liquid and gaseous fuel to a subset of cylinders of the engine, as indicated at 806. During the skip fire operation, only a subset of cylinders (e.g., one) receives fuel for combustion, while the remaining cylinders do not undergo combustion. As used herein, subset of cylinders includes at least one cylinder but less than all cylinders of the plurality of cylinders of the engine. The gaseous fuel supplied to the active subset of cylinders may be combusted by injected liquid fuel. By operating only a subset of cylinders, the amount of fuel supplied to each active cylinder may be increased relative to when all cylinders are active, thus enabling operation with gaseous fuel. In contrast, during engine idle conditions prior to shutdown, if all cylinders are active, the amount of gaseous fuel available to supply to the cylinders may be too low to sustain combustion of the gaseous fuel.

The number of cylinders selected to be in the subset of cylinders (e.g., the number of cylinders selected to receive both liquid and gaseous fuel) may be based on the amount of gaseous fuel trapped in the gaseous fuel rail. For example, the gaseous fuel flow rate and/or gaseous fuel rail pressure may be determined when the shutdown request is received and the number of cylinders selected to receive gaseous and liquid fuel determined based on the flow rate or pressure, such that as the flow rate or pressure of the gaseous fuel increases, the number of selected cylinders increases. The number of selected cylinders may further be based on one or more of an upper limit gaseous fuel substitution ratio or a lower limit gaseous fuel substitution ratio, when the engine is configured to combust the gaseous fuel with liquid fuel injection. The substitution ratio refers to the amount of power derived from gaseous fuel to liquid fuel, and is selected and/or limited by engine operating conditions such as engine speed. Thus the upper limit gaseous fuel substitution ratio may indicate the maximum amount of gaseous fuel that can be provided to a cylinder and the lower limit gaseous fuel substitution ratio may indicate the minimum amount of gaseous fuel needed to sustain combustion of the gaseous fuel.

In another example, selectively fueling the engine with gaseous fuel may include skip firing the engine and supplying only gaseous fuel to a subset of cylinders and only liquid fuel to remaining cylinders of the engine, as indicated at 808. In this way, combustion may occur only in the cylinders receiving liquid fuel and not in the cylinders receiving gaseous fuel. The gaseous fuel trapped in the gaseous fuel rail is thus passed through the engine.

In a further example, selectively fueling the engine with gaseous fuel includes supplying gaseous fuel the engine when the engine is turning but not combusting, as indicated at 810. This may include when the engine is being cranked by the starter motor during an engine start, when the engine is spinning down during the engine shut down, when the engine is being turned by an alternator, or other condition where combustion is not needed but the engine still turns. To prevent combustion from occurring, no liquid fuel or other ignition source is provided to the cylinders, and thus the gaseous fuel in the gaseous fuel rail and/or gaseous fuel in the cylinders is directed out of the engine.

Removing the trapped gaseous fuel may be performed without routing the gaseous fuel through the engine. To remove the gaseous fuel in this manner, method 800 may include, at 812, opening the vent valve in the vent line coupled to the gaseous fuel rail and activating the ignition source in the vent line to combust the gaseous fuel. By opening the vent valve, the gaseous fuel in the gaseous fuel rail may be directed out of the rail and through the vent line. Before reaching atmosphere, the gaseous fuel may be combusted via the ignition source. To confirm that the gaseous fuel is being combusted and not released to atmosphere, a temperature sensor may be positioned near the ignition source. If the gaseous fuel is not combusted by the ignition source, the vent valve may be closed and the gaseous fuel may be removed by another mechanism.

At 814, method 800 includes shutting down the engine, for example by stopping liquid fuel injection. The shutting down of the engine may be performed after the gaseous fuel is removed from the gaseous fuel rail, as indicated at 816. This may include shutting down the engine in response to an indication that the gaseous fuel is removed from the gaseous fuel rail, for example in response to feedback from a gaseous fuel rail pressure sensor or after a threshold amount of time has elapsed. In one example where the gaseous fuel is removed via skip firing the engine with both liquid and gaseous fuel provided to a subset of the cylinders (and not the remaining cylinders), as described above at 806, the engine may be shut down after a predetermined number of engine cycles has occurred, where the number of engine cycles is based on the amount of gaseous fuel originally in the rail, number of selected active cylinders, and the amount of gaseous fuel supplied to each cylinder.

A further example mechanism for removing trapped gaseous fuel may be performed after engine shutdown. As indicated at 818, the gaseous fuel that remains in the gaseous fuel rail may be expanded in an expansion chamber, such as chamber 360 of FIG. 3, that is fluidically coupled to the gaseous fuel rail. The additional volume provided by the expansion chamber may allow the gaseous fuel to reach atmospheric pressure, whereby it will no longer expand across the gas admission valves and into the engine. The gaseous fuel in the expansion chamber may be directed back to the gaseous fuel rail prior to or during a subsequent engine operation, as indicated at 820, via introduction of intake manifold pressure or via activation of an actuator of the chamber. Method 800 then returns.

Thus, method 800 described above provides for removing gaseous fuel between a gaseous fuel supply valve and the gas admission valves of the gaseous fuel system. The gaseous fuel may be removed prior to shutting down the engine or it may be removed after engine shutdown but before a subsequent engine start. The gaseous fuel may be supplied to the engine, where it may either be combusted or travel through the engine uncombusted. Additionally or alternatively, the gaseous fuel may be vented out of the gaseous fuel rail via a vent line. The gaseous fuel in the vent line may be combusted and then released to atmosphere, or it may be stored in an expansion chamber and then directed back to the rail during an engine start. By doing so, the gaseous fuel may be prevented from expanding into the engine, where it could disrupt combustion during a subsequent engine start.

An example of a system includes a fluid system configured to maintain a fluid at a pressure downstream of a check valve; and a controller configured to: determine if a leak is present in the fluid system based on a first pressure decay rate of the fluid system; and responsive to identifying that a leak is present in the fluid system, differentiate between an internal leak and an external leak based on a leak flow rate as fluid system pressure decreases.

In a first example of the above system, the controller is configured to differentiate between an internal leak and an external leak based on a directionality of a change in the leak flow rate as the fluid system pressure decreases. A second example of the system may optionally include the first example and additionally or alternatively includes wherein the fluid system comprises a fuel system of an engine including a high-pressure pump to deliver fuel to a fuel rail, and wherein the check valve is positioned in the high-pressure fuel pump. A third example of the system optionally includes one or more of the first and second examples, and additionally or alternatively includes wherein the controller is configured to determine the leak is an internal leak if the leak flow rate increases as pressure in the fuel system decreases. A fourth example of the system optionally includes one or more of the first, second, and third examples, and additionally or alternatively includes wherein the controller is configured to determine the leak is an external leak if the leak flow rate decreases as pressure in the fuel system decreases. A fifth example of the system optionally includes one or more of the first, second, third, and fourth examples, and additionally or alternatively includes wherein the controller is configured to maintain engine operation in response to determining that the leak is an internal leak and shut down the engine in response to determining that the leak is an external leak. A sixth example of the system optionally includes one or more of the first, second, third, fourth, and fifth examples, and additionally or alternatively includes wherein the leak flow rate is estimated based on a second pressure decay rate.

Another example of a system includes a gaseous fuel supply system to supply gaseous fuel from a gaseous fuel storage source to an engine having a plurality of cylinders; and a controller configured to detect a request to shut down the engine; and in response to detecting the request, remove gaseous fuel trapped within the gaseous fuel supply system by closing a gaseous fuel supply valve and selectively fueling gaseous fuel to the engine.

In a first example of the above system, the gaseous fuel supply system comprises a gaseous fuel rail including a plurality of gas admission valves, each gas admission valve to supply gaseous fuel to a respective cylinder of the plurality of cylinders, wherein the gaseous fuel supply valve is located upstream of the gaseous fuel rail, and wherein the gaseous fuel trapped within the gaseous fuel supply system is trapped between the gaseous fuel supply valve and plurality of gas admission valves. A second example of the above system optionally includes the first example and additionally or alternatively includes wherein the engine is configured to combust liquid fuel and gaseous fuel, wherein to selectively fuel gaseous fuel to the engine, the controller is configured to supply both gaseous fuel and liquid fuel to each cylinder of a subset of cylinders of the plurality of cylinders, thereby to combust the gaseous fuel trapped within the gaseous fuel supply system, the subset including at least one cylinder but less than all cylinders of the plurality of cylinders. A third example of the system optionally includes one or more of the first and second examples and additionally or alternatively includes wherein a number of cylinders in the subset of cylinders is selected based on one or more of an initial gaseous fuel supply system pressure, an upper limit gaseous fuel substitution ratio, a lower limit gaseous fuel substitution ratio, or a threshold time limit. A fourth example of the system optionally includes one or more of the first, second, and third examples and additionally or alternatively includes wherein in response to detecting that the gaseous fuel trapped within the gaseous fuel supply system has been removed, the controller is further configured to shut down the engine. A fifth example of the system optionally includes one or more of the first, second, third, and fourth examples and additionally or alternatively includes wherein the engine is configured to combust liquid fuel and gaseous fuel, wherein to selectively fuel gaseous fuel to the engine, the controller is configured to supply only gaseous fuel to a subset of cylinders of the plurality of cylinders and to combust only liquid fuel in remaining cylinders of the plurality of cylinders. A sixth example of the system optionally includes one or more of the first, second, third, fourth, and fifth examples and additionally or alternatively includes wherein to selectively fuel gaseous fuel to the engine, the controller is configured to supply only gaseous fuel to the engine while the engine is turning but combustion is not occurring prior to an engine restart following the request to shut down the engine. A seventh example of the system optionally includes one or more of the first, second, third, fourth, fifth, and sixth examples and additionally or alternatively includes an expansion chamber fluidically coupled to the gaseous fuel supply system. An eighth example of the system optionally includes one or more of the first, second, third, fourth, fifth, sixth, and seventh examples and additionally or alternatively includes an ignition source fluidically coupled to the gaseous fuel supply system via a vent line and a vent valve positioned in the vent line between the gaseous fuel supply system and the ignition source, and wherein the controller is configured to further remove gaseous fuel trapped within the gaseous fuel supply system by opening the vent valve and activating the ignition source in response to the request to shut down the engine.

A further example of a system includes an engine having a plurality of cylinders configured to combust liquid fuel and gaseous fuel; a gaseous fuel supply system including a gaseous fuel rail having a plurality of gas admission valves, each gas admission valve to supply gaseous fuel to a respective cylinder of the plurality of cylinders, and a gaseous fuel supply valve located upstream of the gaseous fuel rail; an expansion chamber fluidically coupled to the gaseous fuel supply system; and a controller configured to detect a request to shut down the engine; and in response to detecting the request, remove gaseous fuel trapped within the gaseous fuel supply system by closing the gaseous fuel supply valve and expanding the gaseous fuel in the expansion chamber.

In a first example of the above system, the controller is further configured to, in response to a subsequent request to restart the engine following the shutdown of the engine, direct the gaseous fuel in the expansion chamber back to the gaseous fuel supply system. A second example of the system optionally includes the first example and additionally or alternatively includes an ignition source fluidically coupled to the gaseous fuel supply system via a vent line and a vent valve positioned in the vent line between the gaseous fuel supply system and the ignition source, and wherein the controller is configured to further remove gaseous fuel trapped within the gaseous fuel supply system by opening the vent valve and activating the ignition source in response to the request to shut down the engine. A third example of the system optionally includes one or more of the first or second examples and additionally or alternatively includes wherein the controller is configured to further remove gaseous fuel trapped within the gaseous fuel supply system by selectively fueling gaseous fuel to the engine after closing the gaseous fuel supply valve.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a fluid system in an engine configured to maintain a fluid at a pressure downstream of a check valve; and
a controller configured to:
   determine if a leak is present in the fluid system based on a first pressure decay rate of the fluid system;
   responsive to identifying that a leak is present in the fluid system, differentiate between an internal leak and an external leak based on a leak flow rate as fluid system pressure decreases; and
   maintain engine operation in response to determining that the leak is an internal leak and shut down the engine in response to determining that the leak is an external leak;
wherein the controller is configured to differentiate between an internal leak and an external leak based on a directionality of a change in the leak flow rate as the fluid system pressure decreases.

2. The system of claim 1, wherein the fluid system comprises a fuel system of an engine including a high-pressure pump to deliver fuel to a fuel rail, and wherein the check valve is positioned in the high-pressure fuel pump.

3. The system of claim 2, wherein the controller is configured to determine the leak is an internal leak if the leak flow rate increases as pressure in the fuel system decreases.

4. The system of claim 2, wherein the controller is configured to determine the leak is an external leak if the leak flow rate decreases as pressure in the fuel system decreases.

5. The system of claim 1, wherein the leak flow rate is estimated based on a second pressure decay rate.

6. The system of claim 1, further comprising an indicator light configured to be illuminated based on the determination of an external leak or an internal leak.

7. A method comprising:
operating a fluid system in an engine configured to maintain a fluid at a pressure downstream of a check valve;
with a controller, determining if a leak is present in the fluid system based on a first pressure decay rate of the fluid system;

responsive to identifying that a leak is present in the fluid system, with the controller, differentiating between an internal leak and an external leak based on a leak flow rate as fluid system pressure decreases; and with the controller, maintaining operation of the engine in response to determining that the leak is an internal leak and shutting down the engine in response to determining that the leak is an external leak;

wherein differentiating between an internal leak and an external leak is based on a directionality of a change in the leak flow rate as the fluid system pressure decreases.

8. The method of claim 7, wherein the engine comprises a high-pressure pump to deliver fuel to a fuel rail, and wherein the check valve is positioned in the high-pressure fuel pump.

9. The method of claim 8, wherein determining the leak is an internal leak is based on the leak flow rate increasing as pressure in the fuel system decreases.

10. The method of claim 8, wherein the leak is determined as an external leak if the leak flow rate decreases as pressure in the fuel system decreases.

11. The method of claim 7, wherein the leak flow rate is estimated based on a second pressure decay rate.

12. The method of claim 7, further comprising illuminating an indicator light based on the determination of an external leak or an internal leak.

13. A vehicle system, comprising:
an engine comprising a fluid system configured to maintain a fluid at a pressure downstream of a check valve; and a controller configured to:
determine if a leak is present in the fluid system based on a first pressure decay rate of the fluid system using a pressure sensor;

responsive to identifying that a leak is present in the fluid system, differentiate between an internal leak and an external leak based on a leak flow rate as fluid system pressure decreases; and maintain engine operation in response to determining that the leak is an internal leak and shut down the engine in response to determining that the leak is an external leak;

wherein the controller is configured to differentiate between an internal leak and an external leak based on a directionality of a change in the leak flow rate as the fluid system pressure decreases.

14. The system of claim 13, wherein the engine comprises a high-pressure pump to deliver fuel to a fuel rail, and wherein the check valve is positioned in the high-pressure fuel pump.

15. The system of claim 14, wherein the controller is configured to determine the leak is an internal leak if the leak flow rate increases as pressure in the fuel system decreases.

16. The system of claim 14, wherein the controller is configured to determine the leak is an external leak if the leak flow rate decreases as pressure in the fuel system decreases.

17. The system of claim 13, further comprising illuminating an indicator light based on the determination of an external leak or an internal leak.

* * * * *